United States Patent [19]

Large et al.

[11] Patent Number: 5,608,662
[45] Date of Patent: Mar. 4, 1997

[54] PACKET FILTER ENGINE

[75] Inventors: James Large, Wexford; Joseph M. Newcomer; Robert Thibadeau, both of Pittsburgh, all of Pa.

[73] Assignee: Television Computer, Inc., Pittsburgh, Pa.

[21] Appl. No.: 372,013

[22] Filed: Jan. 12, 1995

[51] Int. Cl.[6] .................... G06F 7/22; H04N 7/10
[52] U.S. Cl. .................... 364/724.01; 364/715.01; 370/394; 370/411; 395/22; 375/232
[58] Field of Search ............... 370/60, 123; 364/724.01, 364/715.01; 395/22; 375/232

[56] References Cited

U.S. PATENT DOCUMENTS

| | | | |
|---|---|---|---|
| 3,993,955 | 11/1976 | Belcher et al. | 325/308 |
| 4,054,911 | 10/1977 | Fletcher et al. | 358/141 |
| 4,058,830 | 11/1977 | Guinet et al. | 358/86 |
| 4,099,258 | 7/1978 | Parsons | 364/900 |
| 4,099,259 | 7/1978 | Parsons et al. | 364/900 |
| 4,155,042 | 5/1979 | Permut et al. | 325/64 |
| 4,322,854 | 3/1982 | Bundens et al. | 455/5 |
| 4,323,921 | 4/1982 | Guillou | 358/144 |
| 4,361,848 | 11/1982 | Poignet et al. | 358/1 |
| 4,420,833 | 12/1983 | Noirel | 370/83 |
| 4,450,477 | 5/1984 | Lovett | 358/86 |
| 4,450,481 | 5/1984 | Dickinson | 358/114 |
| 4,598,385 | 7/1986 | Kessels et al. | 364/900 |
| 4,600,921 | 7/1986 | Thomas | 340/825.31 |
| 4,602,279 | 7/1986 | Freeman | 358/86 |
| 4,675,865 | 6/1987 | De Vries et al. | 370/85 |
| 4,677,686 | 6/1987 | Hustig et al. | 455/5 |
| 4,686,564 | 8/1987 | Masuko et al. | 358/86 |
| 4,734,764 | 3/1988 | Pocock et al. | 358/86 |
| 4,757,374 | 7/1988 | Ramsay et al. | 355/40 |
| 4,829,372 | 5/1989 | McCalley et al. | 358/86 |
| 4,860,379 | 8/1989 | Schoenberger et al. | 455/5 |
| 4,868,866 | 9/1989 | Williams, Jr. | 380/49 |
| 4,894,789 | 1/1990 | Yee | 364/521 |
| 5,070,404 | 12/1991 | Bullock et al. | 358/142 |
| 5,155,591 | 10/1992 | Wachob | 358/86 |
| 5,155,812 | 10/1992 | Ehlig et al. | 395/275 |
| 5,159,609 | 10/1992 | Palicot | 364/724.02 |
| 5,260,778 | 11/1993 | Kauffman et al. | 358/86 |
| 5,311,508 | 5/1994 | Buda et al. | 370/60 |
| 5,495,426 | 2/1996 | Waclawsky et al. | 370/60 |

*Primary Examiner*—George B. Davis
*Attorney, Agent, or Firm*—Eckert Seamans Cherin & Mellott

[57] ABSTRACT

A data processor is connected to a digital communication system such that information packets broadcast on the system are examined to determine if the contents of each packet meet selection criteria, whereupon the packet is coupled to the processor. A state machine or interface processor is connected between the processor and the network, and compares packets to the selection criteria, passing accepted packets and blocking rejected ones. The selection criteria are programmed into the state machine as a decision tree of any length, configuration or data requirements, preferably by the attached data processor, and can include examination of arbitrary sections of the packet for equality/inequality, greater-than/less than, signed and unsigned comparisons and bit mask comparisons. Thus content is variably examined, as opposed to checking for an address or key code at a given byte position. The state machine operates on recognition instructions including byte offset and content specifics. The recognition instructions can include plural distinct criteria, determined by the data processor to serve applications programs running in a multitasking environment. Thus, the data processor compiles a series of recognition instructions that are passed to the state machine as tasks in the multitasking environment are added or deleted, or when a task decides to change selection requirements. Preferably, signaling lines allow the data processor to determine the reason for selection of a packet, for example by the state machine reporting to the data processor its program count upon acceptance.

27 Claims, 9 Drawing Sheets

PACKET FILTER ENGINE

BACKGROUND OF THE INVENTION

1. Field of the Invention

The invention relates to the field of methods and apparatus operable to identify desired information in a stream of information on a signal path according to programmable criteria, such that a selected subset of information or packets are processed and other information is ignored. In particular, the invention concerns a programmable apparatus that accepts selection criteria from a user and monitors and selects information data packets according to the criteria, for processing steps such as storage, display, printing or the like. It is an aspect of the invention to provide for recognition of relevant packets on a communication line without requiring processing by a data processing system to which the communication line is connected.

2. Prior Art

There are various situations and various types of communication signal paths in which it would be desirable to enable a selection of data to be processed and to cause other data to be ignored or perhaps processed differently. One example is a broadcast data network, i.e., a network wherein data are transmitted generally to a number of subscriber stations. The data are subdivided into data set groupings, such as a number of consecutive bytes typically including leading and/or trailing marker or information bytes or the like, which groupings are termed "packets." The present invention is applicable to a range of types of such communication systems and to different types of data set groupings. However, an exemplary usage of such a device is in connection with packets from a broadcast data network, and in particular wherein certain packets of data are of interest to a subset of receivers coupled to the data network and not to others.

A packet is a sequence of bytes delivered by the communication line that are rendered distinct from other sequences of bytes, according to a protocol applied when the bytes are encoded and decoded. Packet techniques are well known and include, for example, the EtherNet protocol (IEEE standard 802.3) and commercial packet protocols such as the Synchronous Data Link protocol (SDLC) and X.25. An external circuit monitors the incoming communication line and determines when the packet begins. Bytes of the packet are then processed until packet reception is complete.

Commercially available circuits and interfaces are known for performing the tasks of recognizing the beginning of a packet and processing bytes until complete, for example as known from a byte count, end marker or the like. The generic function of receiving packets is thus known. However, once a packet or sequence of bytes is extracted from the communication network, there are a variety of possibilities as to how the encoded data are to be processed.

In a conventional broadcast network, the sender of the data packet encodes information that explicitly determines a recipient, or a set of recipients, to whom the data packet is directed. The recipient, or set of recipients, is identified in the packet by the sender inserting specific bytes in the message at the time of transmission. Conventional circuitry as described above, for example, recognizes information at a predetermined byte or bit position, typically in a header block at the start of the packet. This information is used to identify the intended receiver or receivers. Only packets destined for the respective data processing equipment require intervention by the data processing equipment and other packets can be ignored.

The distinct encoding and decoding of packets conventionally is used for addressing and for authorization purposes. The prior art includes specialized circuitry to handle authorization, so that only packets that are authorized for a particular receiver can be received by the attached data processing equipment, for example, to permit access by paying subscribers only. Such addressing or authorization schemes are predicated on recognizing predetermined data values in a header or similar identifying block, typically a fixed and small number of specific values in predetermined bit or byte positions in the first few bytes of a packet. Known authorization and addressing devices as described rely on a simple criterion for determining if a packet should be coupled through from the communication line to the attached data processing equipment, although there are various specific applications, including authorization codes, unique network address codes, and/or encoding of "broadcast" packets intended for reception by all data processing equipment attached to the communications network and the like.

In a public information broadcast network, information on the network is spontaneously volunteered by one or more transmitting devices. Often a plurality of programs are broadcast simultaneously over a medium, for example as known in connection with cable television, and selection codes may be incorporated in the signals to handle authorization and/or selection for processing. It is possible to categorize the information by its transmission channel, by scheduling and the like, or to provide a category code in the header. In this manner, different categories of information can be transmitted simultaneously or successively, and the decision to accept or reject a particular packet can be made independently at each receiver by hardware and/or manual switching means. If available, manual user selections are made based on program content, but as a practical matter, the content is not gleaned from the signal. It is provided by other means associated with the source of the signal and the user or switching means simply enables and disables coupling between the user's receiver and one of a small number of sources.

In connection with data transmission, if a packet does not include identifying information such as an address or category designation or the like, or if it is desirable to select and reject packets within some arbitrary category code of interest to the user or perhaps programmed into the user's processing equipment, it may be necessary for the receiving equipment to examine the entire contents of the packet in order to determine if the packet should be accepted or rejected. There is therefore a processing problem in the situation where the packet lacks encoding or categorization data that a particular recipient of the packet can use to distinguish desirable packets from undesirable ones, and instead the decision is to be based on data content and not on addressing or categorization codes. The decision must be based on the presence or absence of particular information such as a series of bytes, data ranges, Boolean combinations and similar attributes that potentially may occur anywhere in the data. Conventionally, if data packets are to be accepted and rejected on this basis, it is necessary for the data processing equipment to receive and store every packet and then to examine the packets for the user's selection criteria.

It would be advantageous if the data processing equipment could be relieved of the requirement to store and examine the data packets, which would allow the equipment to be employed more fully for processing the data packets instead of determining their suitability. The present invention provides an optimal programmable packet filter for this purpose, that is responsive to the basic data processing equipment and moreover is programmed with decision criteria from the basic processing equipment. The selection of packets need not be based on their source or any other fixed field, but instead can be based on arbitrarily complex content criteria. Effectively, this permits the user, and/or the user's processing equipment, to define categories that are much more versatile and variable than any selection of sources, channels or encoded authorization and identifying codes. More significantly, this permits the receiver to define useful categories that could not have been anticipated by the information broadcaster.

It is known how to check for particular data in a record using a dedicated device rather than a general purpose processing apparatus. U.S. Pat. No. 4,598,385—Kessels et al., for example, teaches a device for handling database records that are subdivided into fields of variable value, and determining whether the information in a particular field matches a selection data value. The database records, which are stored in a system memory element, are serially shifted through a comparison element to which the selection value is coupled. At least one complete record (and according to one embodiment, two records) is stored, and the selection value or reference record is stored. A mask is defined for selecting the field of the record to be compared to the reference record and a decision is reached as to whether the selected portions match. Further comparisons are possible (by changing the mask) to check other associated data values in a record if the initially selected field values match. This arrangement is useful for rigidly formatted database records, but is sensitive to the field position or byte position of the data in the record. The device looks for an expected data record at an expected byte position, and is useful only for a known fixed format as characteristic of database records and of identifying codes in packet headers. However, it would be advantageous if records could be selected and filtered independently of alignment and similar formatting particulars, preferably using minimal memory, and preferably permitting decisions based on more versatile content-based comparisons. In this manner, according to the present invention, a meaningful content-based decision for selection and rejection of records is made while expending minimal memory and processing resources of the underlying data processing device.

SUMMARY OF THE INVENTION

The present invention provides a method and apparatus for filtering packets received from a public information broadcast network or the like. It is an object of the invention to conserve resources of an attached data processor arranged to process selected data, such as its memory and processor time, by preliminarily rejecting as many undesirable packets as possible. In this manner the attached data processing equipment can be devoted to processing desirable data and not to examining each packet received to determine if it should be accepted or rejected. The criteria for acceptance or rejection are variable at the option of one or more programs running on the attached data processing equipment, enabling the selection criteria to be variably defined to meet the objects of a user or the like. The selection/rejection problem can be complex, particularly when the attached data processing equipment is running a plurality of such programs in a multitasking mode. Such programs are termed "applications" in this disclosure.

It is another object of the invention to deal optimally with one or more variable criteria for packet acceptance based on the content of arriving packets, and to deliver to the data processing equipment only packets meeting the criteria, while permitting the data processing equipment to determine via one or more programs how and whether to route the information received to applications for which they are intended.

It is a further object to provide users or their processing equipment with more meaningful access to information sources that contain numerous information packets, whether on one or a number of media, substantially independently of formatting details such as identifying or authorization codes, whereby the information can be optimally sifted or filtered for desirable information at minimal overhead to the data processing equipment intended to handle the information.

These and other objects are met according to the invention using a programmable device that is attached to the data processing equipment and to the communication line and mediates the reception of data packets. A filter program is stored in the programmable device or packet filter engine, and operates such that only those packets that are accepted by the filter program as requiring processing by the data processing equipment are routed for processing. Packets which are not accepted by the filter program require no action by the attached data processing equipment and can be ignored, or processed according to less critical requirements.

DETAILED DESCRIPTION OF PREFERRED EMBODIMENTS

Figure 1:
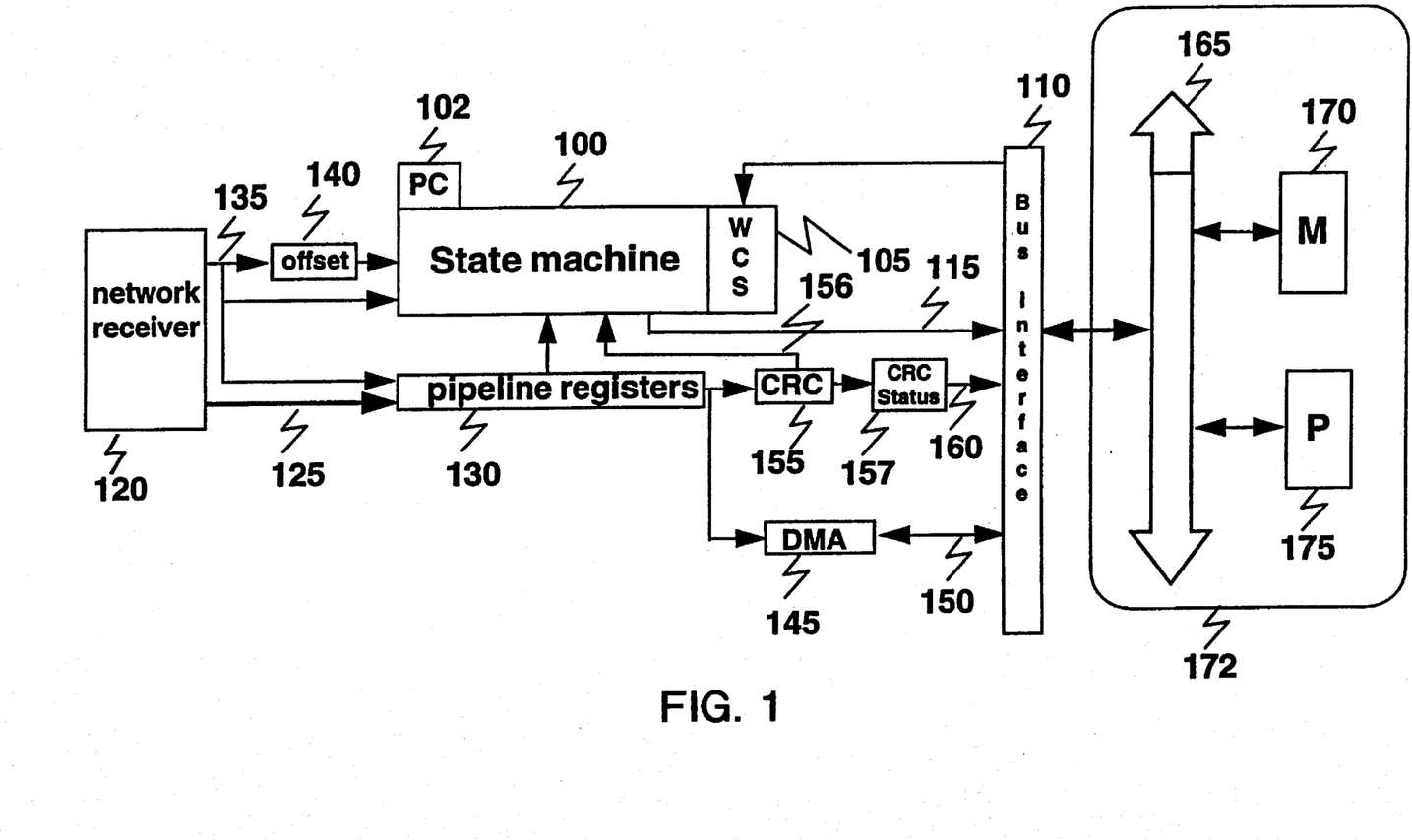
FIG. 1 schematically illustrates the overall system architecture of the invention, which, as shown, interconnects the packet filter engine of the invention between a source of serial data and an attached article of data processing equipment.

Referring to FIG. 1, the invention generally comprises a state machine 100 which is programmable via a Writable Control Store 105 for selection and rejection of data packets according to variable criteria as discussed in detail below.

Control store 105 is loaded from the attached data processing equipment 172 through an interface 110. The state machine examines an incoming message stream, and based on the criteria programmed in via the Writable Control Store, determines whether the packet being received is to be accepted or rejected based on information the packet contains. The attached data processing equipment 172 represents a programmable data processing system of conventional design consisting typically of a central processor 175, a memory 170 and an interconnecting bus 165.

Status of the state machine is transmitted to the attached data processing equipment 172 via a set of signals designated the status interface 115. If a packet is accepted, the attached data processing equipment is notified, using a signal on the interface 110.

According to one embodiment, the status interface signal generated upon a decision to accept a packet can be a simple request for interrupt of the attached data processing equipment. In another embodiment, the signals over status interface 115 additionally encode information that allows the data processing equipment to determine the exact state that accepted the packet. In yet another embodiment, information about the exact state which accepted the packet can be read by the attached data processing equipment by reading a register connected to the interface, whereby the state can be determined at the option of applications running in data processing equipment 172, where some applications may require such information and others may not.

Packets are received from the broadcast data network by a network receiver 120. Receiver 120 can be based upon any of several well-known technologies capable of receiving data packets, and the specific type of receiver is not part of this invention. Receiver 120 generates, in known manner, a set of synchronizing or control signals 135 and data signals 125. The data signals represent one information unit delivered from the receiver, which is described herein as a byte. A byte will be presumed for convenience to include 8 bits of information, but other byte sizes may be used in the same manner as described herein.

The byte is transmitted from network receiver 120 on data connection 125 into a series of registers shown as pipeline register 130. Receiver 120 comprises means to recognize the start of a new packet, for example responsive to a start code. Upon commencement of a new packet (or alternatively upon completion of a previous one as indicated by a stop code), a control signal is generated by receiver 120 on control line 135 to reset state machine 100 to a known state, which can be called the initial state, and to reset a counter, called the offset counter 140, to zero. As each byte is received, a control signal on control line 135 causes the byte to be stored in pipeline registers 130, and increments offset counter 140. The offset counter represents the offset in the message of the first byte in Pipeline Register 130.

According to one aspect of the invention, the pipeline register can be provided with sufficient serially coupled memory cells to hold the longest possible message packet that would be broadcast. However, the number of pipeline registers is constrained as a practical matter by considerations of cost, performance, and limitations of semiconductor technology to provide on-chip registers, and preferably the invention is structured and arranged as discussed below as to function with a limited number of pipeline register cells. The invention does not exclude embodiments which can store an entire packet or, that treat the memory addressed by the program in the Writable Control Store as conventionally-addressed random access memory (RAM) or, that require a limited maximum byte count for packets. However, it is advantageous to arrange the device to function also with a smaller number of serially coupled pipeline cells than the largest packet it may receive.

As bytes of a given packet continue to be received by network receiver 120 and are shifted through pipeline register 130, the leading bytes reach the end of the pipeline register. Until a decision is reached to reject a packet, and assuming the packet byte count may exceed the capacity of pipeline register 130, the leading bytes are passed to the Direct Memory Access (DMA) controller 145, which stores the bytes in memory 170 via the interface 110 and signal line 150. The DMA controller operates in a known manner to load the bytes directly into memory 170, without requiring processing of memory access instructions by the data processor 175. The bytes preferably also are passed to other circuitry such as a Cyclic Redundancy Check (CRC) unit 155, the result of which can be stored in a CRC status register 157 and read by processor 175 through the interface and signal line 160. An error detected by the CRC unit can also be routed to the state machine 100 to force it to change its notification from "accept" to "reject" and to indicate via the status interface 115 that a data checksum error has occurred.

In the preferred embodiment shown in FIG. 1, a single processor 175 and memory unit 170 are illustrated, as is a single system bus 165. These constitute the attached data processing equipment, 172. The system bus, processor, and memory can be conventional devices, and alternative configurations of these components may be used without departing from the invention.

Figure 2:
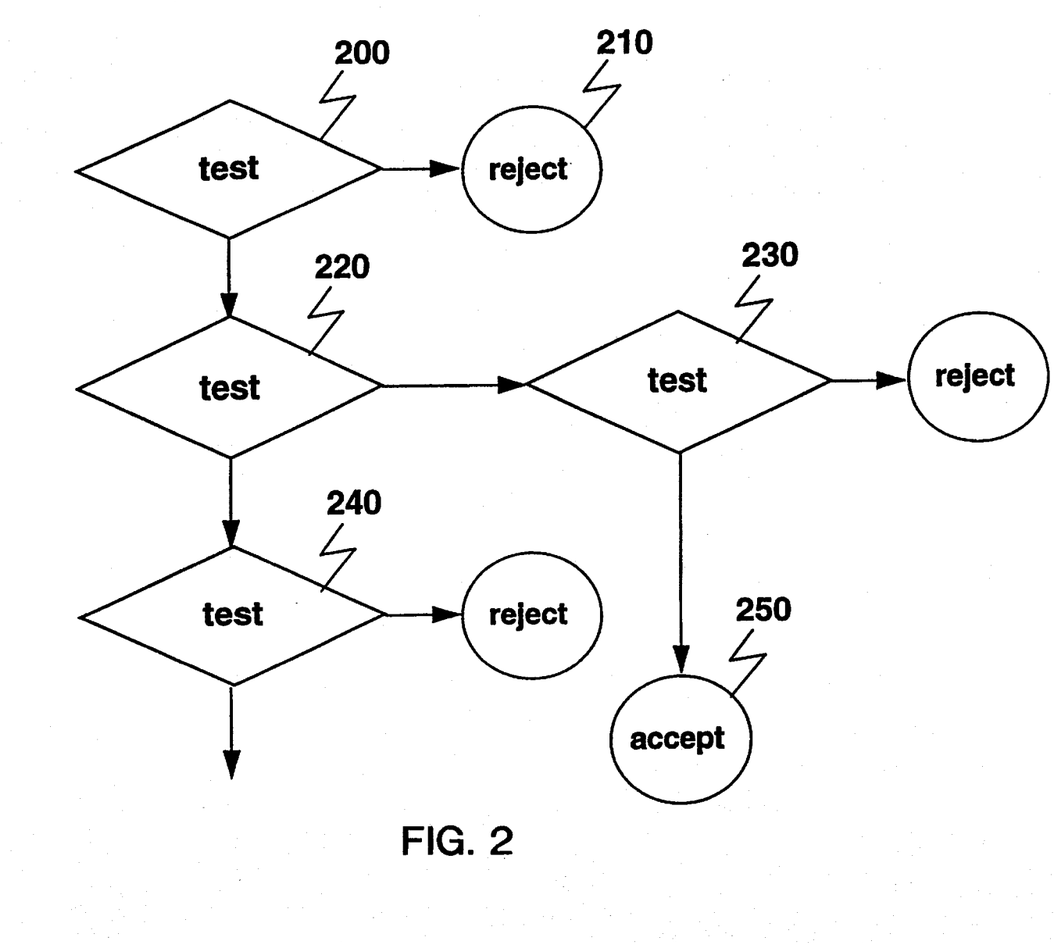
FIG. 2 illustrates an example of a sequence of tests according to the invention, leading to acceptance or rejection of a particular packet.

State machine 100 is provided to execute state programs which implement decision processes as shown in the flow chart of FIG. 2. Each instruction in the state machine tests a single byte in the incoming packet, and therefore represents one test, such as test 200. There are three possible outcomes for tests in general, but for any specific test, only two of the three will be possible. The three possible outcomes are; a decision to reject the incoming packet, a decision to accept the incoming packet, or a decision to perform subsequent tests. One outcome of test 200, is a decision to reject the incoming packet, as illustrated by a transition to a reject state, 210. The other outcome of test 200 is a decision to perform subsequent tests 220. Both outcomes of test 220 are decisions to perform subsequent tests, either test 230 or test 240. The two possible outcomes of test 230 are a decision to reject the incoming packet, or a decision to accept it as illustrated by the transition to accept state, 250.

If a signal appears on the control line 135 indicating that the end of the packet has been detected, a status condition is established for the state machine. An attempt to access a byte beyond the current pipeline register could never be satisfied, because no more bytes would be arriving for that packet. An attempt to access a byte beyond the current pipeline register when the end of the packet has been detected will cause the state machine to be forced into one of the two states. In a preferred embodiment the state machine is forced into a rejection state, which is consistent with the goal that the invention should minimize the need to have the attached data processing equipment 172 process a packet. It is also possible to force an accept decision or to generate a third result such as logging an error code. When the last byte of the packet has been shifted out of the pipeline register 130, it is no longer possible for the state machine to continue processing any of the bytes of the packet. If it has not entered an accepting or rejecting state, the preferred action is to force it into a rejection state as just described. As a consequence of the need to process packets in this fashion, the first byte of a packet cannot be shifted into the pipeline register 130 until the last byte of the preceding packet has been shifted out. This may require that the network receiver circuitry 120 contain a buffer of some description that would hold at least as many bytes as the pipeline register 130. Buffered receiver circuits that satisfy this requirement are commonly available in single-chip implementations.

Figure 3:
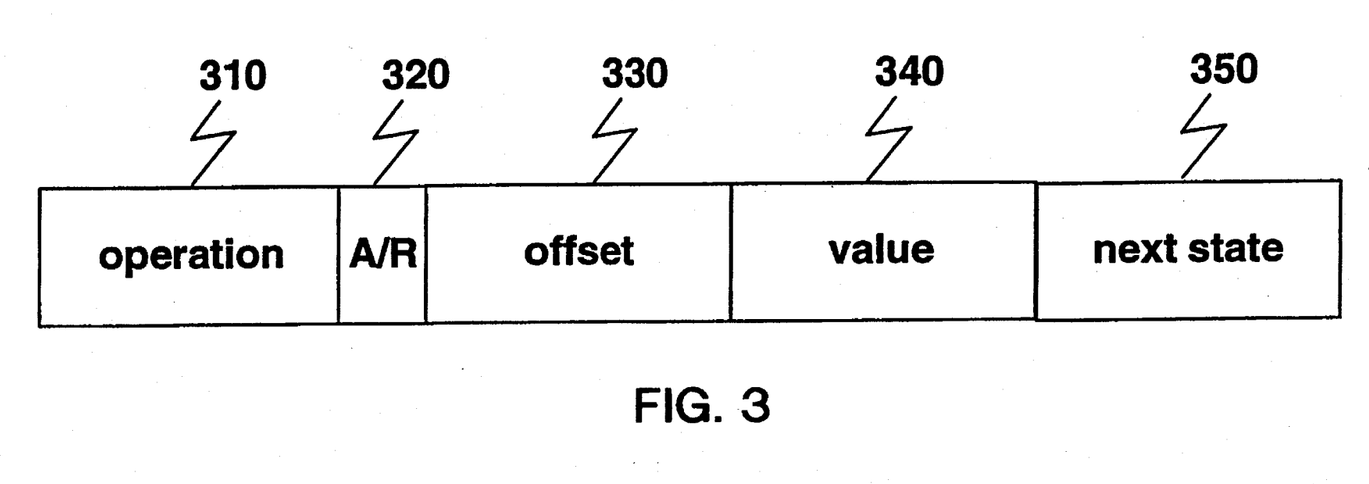
FIG. 3 illustrates a preferred embodiment comprising an instruction word in the Writable Control Store.

State machine 100 preferably operates on instructions of the form shown in FIG. 3. An instruction word comprises a specification of a test. The instruction word can include an operation code 310. A two bit accept/reject (A/R) condition code 320 indicates an acceptance condition, a rejection condition, or the lack of either condition. An offset 330 into the message can be tested against a constant value 340. A specification 350 is included for the next state. The instruction words are contained in the writable control store 105, as shown in FIG. 1.

Value field 340 represents a value that could appear in pipeline registers 130. In a preferred embodiment value field 340 has the same bit width as the bit width of data bytes, e.g., eight bits, and its encoding is the same. In other embodiments, value field 340 has fewer bits or more bits, and can represent a subset of possible data byte values, or multiple-data-byte values, or a subset of multiple-data-byte values. In yet another embodiment, value field 340 may be encoded differently from the data in pipeline 130, for example if the received data is full width ASCII code and the character set used for the value can be shortened by ignoring upper and lower case distinctions or the like. Although the standard eight bit code is preferred, other bit widths are possible for expanded or contracted character sets.

Offset field 330 represents an offset or byte count into a data packet, and consequently is preferably wide enough to encode an offset to the end of the largest expected packet. In a preferred embodiment this is 16 bits, allowing for a packet length of 65,536 bytes. A different maximum length or maximum testable offset could also be chosen. In another embodiment, the offset could encode an offset into the pipeline registers (that is, relative to offset register 140). Because fewer bits would be required to encode this offset, the representation could be more compact, but consequently would be more difficult to program.

Next state field 350 specifies an instruction stored in state machine 100. In changing from the current state to another state, state machine 100 preferably proceeds from the current instruction word either to the one explicitly specified by next state field 350, or to one implicitly specified (e.g., to the instruction word stored in the next control store memory location) depending on the result of a test. Thus, next state field 350 is comparable to the memory address portion of a jump instruction in assembled code. Preferably, next state field 350 has a sufficient bit width to specify the address of any of the instruction words of writable control store 105, but in some embodiments, it may be able to specify only a subset of the instruction words, for example, when the next state field 350 encodes a memory offset relative to the location of the current instruction.

The accept/reject (A/R) state bits 320 indicate whether a particular result of a completed test is to trigger acceptance or rejection of the incoming packet. The A bit, when true, indicates acceptance, while the R bit, when true, indicates rejection (as shown in table I). Alternatively, this can be determined by using designated accept-state or reject-state values for next state field 350. In this manner, state machine 100 can branch through a decision tree as shown in FIG. 2, based on the results of each test. For example, the two-bit A/R code can represent the indications shown in Table I.

TABLE I

Accept/Reject Indications

| A (Accept) | R (Reject) | Value Meaning |
|---|---|---|
| 0 | 0 | continue testing |
| 0 | 1 | reject |
| 1 | 0 | accept |
| 1 | 1 | illegal value |

The available tests are shown as the "Operation" column of Table II, below. These operations are assigned particular bit configurations in operation field 310, in the same manner that assembly opcodes are encoded, but are shown symbolically here. The operator shown as AND (&) is the binary bitwise operation.

TABLE II

Interpretation of Test Types

| OPERATION | TRUE IF . . . |
|---|---|
| LSS | packet byte[offset] < value |
| LEQ | packet byte[offset] ≦ value |
| EQL | packet byte[offset] = value |
| NEQ | packet byte[offset] ≠ value |
| GEQ | packet byte[offset] ≧ value |
| GTR | packet byte[offset] > value |
| AND | packet byte[offset] & value = 0 |
| NAND | packet byte[offset] & value ≠ 0 |
| JUMP | always true |
| NOP | never true |

In another preferred embodiment, the encoding of operation field 310 can be extended as shown in Table III to include both signed and unsigned value tests. Such operations are important when the information may contain multi-byte values, and when conventional 2's complement representations are used for signed values. In this manner one can test coding wherein a negative number is represented by an integer value preceded by a minus sign (or enclosed in parentheses, etc.) and the numerical encoding represents absolute value (i.e., a numerical n-bit byte is interpreted as being in the range (0) to (2n-1)). One can also test coding where a negative number is represented in 2's complement (i.e., an n-bit byte is interpreted as being in a signed range of $(-2(^{n-1}))$ to $(+2(^{n-1})-1)$.

TABLE III

Interpretation of Test Types Including Unsigned Operations

| OPERATION | TRUE IF . . . |
|---|---|
| LSS | packet byte[offset] < value |
| LEQ | packet byte[offset] ≦ value |
| EQL | packet byte[offset] = value |
| NEQ | packet byte[offset] ≠ value |
| GEQ | packet byte[offset] ≧ value |
| GTR | packet byte[offset] > value |
| LSSU | packet byte[offset] < value (unsigned) |
| LEQU | packet byte[offset] ≦ value (unsigned) |
| GEQU | packet byte[offset] ≧ value (unsigned) |
| GTRU | packet byte[offset] > value (unsigned) |
| AND | packet byte[offset] & value = 0 |
| NAND | packet byte[offset] & value ≠ 0 |
| JUMP | always true |
| NOP | never true |

When the state machine is executing, a program counter (PC) 102, shown in FIG. 1, encodes the address in the control store of a particular instruction word to be executed. PC 102 is modified in one of the following ways:

(1) when a signal on line 135 indicates a new packet is beginning, the PC is set to a designated value (e.g., "0") which references a starting instruction;

(2) after an instruction is fetched from the Writable Control Store, the PC is incremented by an amount to cause it to reference the next sequential instruction in the Writable Control Store;

(3) when a test specified by the instruction is successful, and the machine is not otherwise halted by conditions to be set forth below, the contents of the next state field of the instruction being executed are transferred to the PC, forcing execution to continue at the instruction designated by the next state field.

Figure 7:
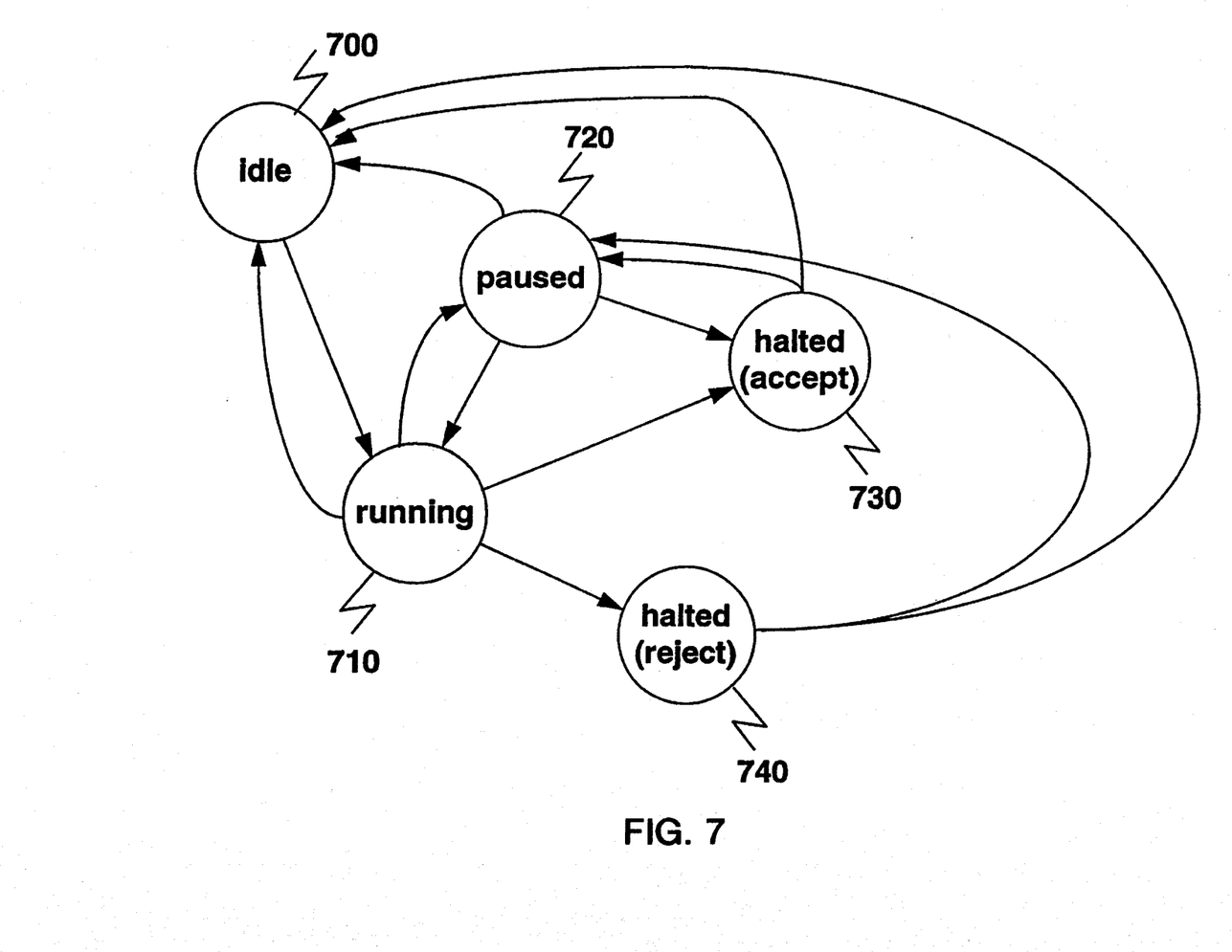
FIG. 7 illustrates a preferred embodiment in which the packet filter engine has discrete operating states and operates as a state machine.

The behavior of the machine is explained with reference to FIGS. 1, 7, 8, and 9. The operational states of the state machine are illustrated in FIG. 7. When the state machine is reset, which in a preferred embodiment is caused by a signal across interface 110, the state machine enters the idle state 700. Until a program is loaded in the Writable Control Store and the state machine is enabled via a signal across interface 110, the state machine remains in the idle state. At any time the state machine can be reset to the idle state via a signal across the interface. This is illustrated in FIG. 7 by the transition arcs from each of the other states back to the idle state.

When a signal transmitted across the interface enables the state machine, the offset counter 140 is set to zero, the program counter is set to its initial designated value, and an additional state register (not shown) is set to indicate that pipeline register 130 contains no data. The state machine assumes a running state 710 and fetches the instruction to which it is directed by PC 102. If the instruction is a NOP instruction or a JUMP instruction, both of which ignore the offset field 330 and value field 340, the instruction is executed and a new instruction is fetched.

This continues until:

(1) an instruction which uses the offset field value is fetched; or (2) a jump instruction specifies an accepting state; or (3) a jump instruction specifies a rejecting state; or (4) an illegal instruction is fetched.

In case (1), because pipeline register 130 contains no valid information, state machine 100 must wait until a byte is loaded into the pipeline register. Accordingly, the state machine enters the paused state 720. In case (2), the machine goes into an accepting state 730 and halts, which means that all of the next packet will be accepted. In this manner, the packet filter can be programmed to accept every packet. In case (3), the machine goes into a rejecting state 740 and halts, which causes the next packet to be rejected. This enables the packet filter to be programmed to reject every packet. In case (4), state machine 100 goes into a rejecting state, and preferably also notifies the attached data processor over status interface 115 that an error occurred, in a manner set forth below.

When control line 135 indicates a new byte is to be loaded into the pipeline register 130, the value in offset counter 140 is compared against the contents of offset field 330 in the instruction word. If offset in counter 140 is less than the value of the instruction word offset 330, no action is taken and the state machine waits for the next byte to be loaded into pipeline register 130. The state machine remains in the paused state 720. If the value in offset counter 140 is equal to or greater than the offset in the instruction word 330, the state machine enters running state 710 and the instruction word is executed.

Execution involves performing the indicated test on the specified byte of the packet, using the packet byte as one operand and the instruction word value 340 as the second operand of the indicated test. If the test yields a "true" result, the accept/reject (A/R) bits 320 are examined.

If the test yields a "true" result and the condition specified in the accept/reject (A/R) bits 320 is to accept the packet, the state machine enters the halted accept state 730, shown in FIG. 7. Meanwhile, the bytes of the packet proceed through pipeline register 130, DMA controller 145, interface 110 and system bus 165 to be stored in memory 170. Preferably the attached data processing equipment 172 is notified of the acceptance of a packet via a signal transmitted on the status interface 115 when the packet is complete. In the preferred embodiment this signal will cause the processor 175 to be interrupted.

If the test yields a "true" result and the condition specified in the accept/reject (A/R) bits 320 is to reject the packet, state machine 100 enters a halted reject state 740 and will not restart until the control line 135 indicates the start of a new packet, at which point state machine 100 returns to the paused state 720. Preferably, no bytes are transferred to memory 170 of the attached data processing equipment if state machine 100 is in the halted reject state.

If the test yields a "true" result and the accept/reject (A/R) bits 320 specify neither acceptance nor rejection, the address of the instruction specified by next state field 350 is loaded into the program counter, causing that instruction to be the one that will be fetched and executed on the next cycle.

If the test yields a "false" result, the state machine remains in the running state. Because the program counter (PC) has been incremented in the manner previously described, the next instruction that will be fetched and executed on the following cycle is the instruction which follows the current instruction. Instruction execution continues in this manner until one of the following conditions occurs:

(1) an accept state is reached and state machine 100 enters the halted accept state 730; or (2) a reject state is reached and the state machine enters the halted reject state 740; or (3) offset field 330 in the instruction word contains a value that is larger than the value in offset counter 140, at which point the machine returns to the paused state 720; or (4) offset field 330 in the instruction word contains a value that is smaller than the value in offset counter 140, minus the length of the pipeline; or (5) an illegal instruction is encountered; or (6) the last byte of the packet is shifted out of the pipeline register 130.

Case (3) exists when the next byte to be examined has not yet been read. Therefore, state machine 100 must wait until the byte is received. When the state machine is in a paused state, bytes which leave the pipeline register 130 are stored in the memory of the attached data processing equipment via the memory interface as described.

Case (4) exists when the byte to be examined has already been shifted out of the pipeline register and therefore cannot be examined. In this case, the program cannot continue meaningfully through the decision branches, and state machine 100 preferably is forced into reject state 740. In a preferred embodiment, state machine 100 additionally notifies the attached data processing equipment via a signal on status interface 115 that the state machine program is erroneous.

Case (5) is necessary to respond to the case of an illegal instruction, where the nature of an illegal instruction is set forth below.

Case (6) deals with the termination condition of a packet, as previously set forth.

Figure 9:
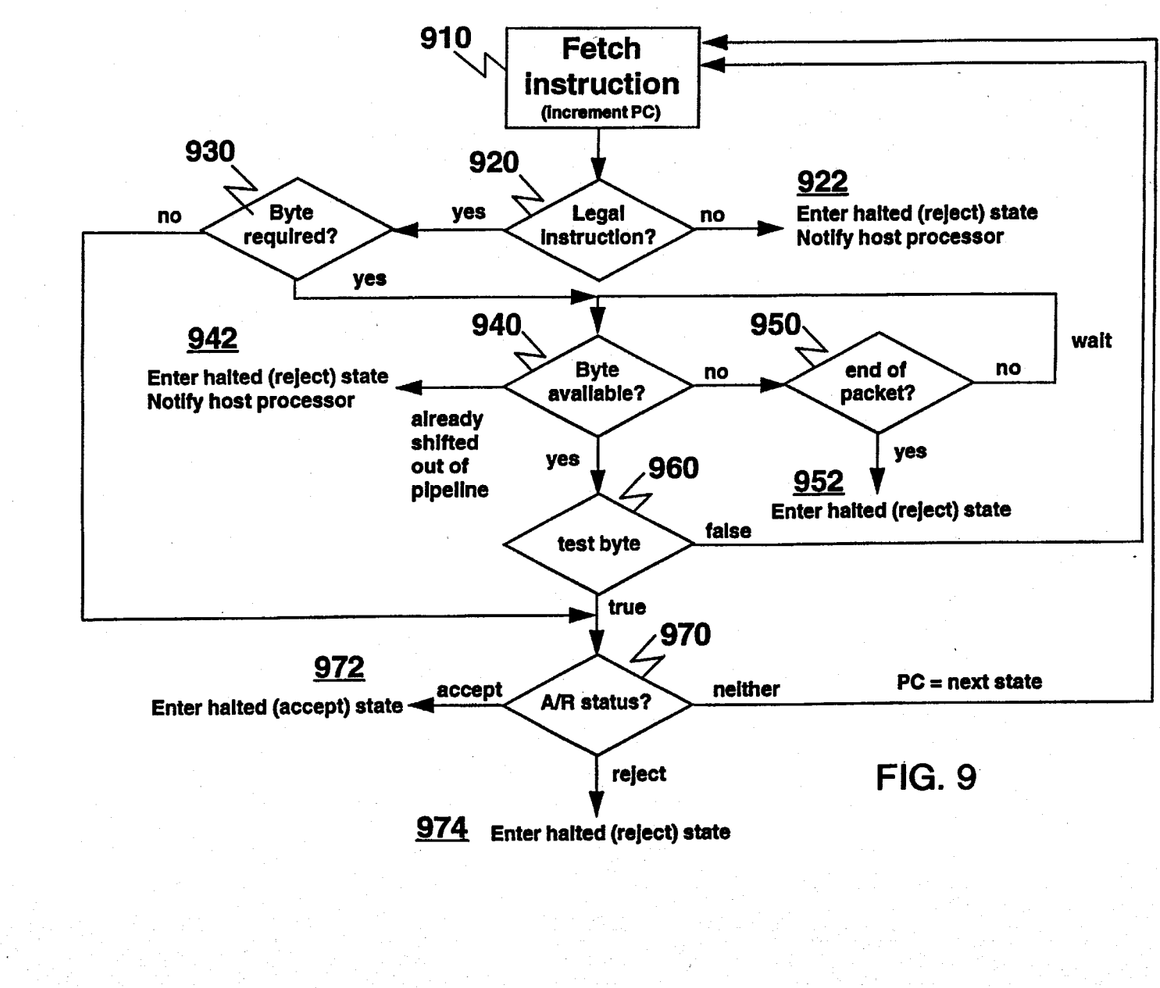
FIG. 9 gives a detailed flowchart of the processing steps of the state machine described for the preferred embodiment.

The execution of state machine 100 is additionally illustrated in FIG. 9. Each cycle begins with fetching an instruction, 910. The program counter is incremented. The instruction is tested for legality at step 920. If it is not a legal instruction, the state machine will halt in the reject state, 922. If the instruction is legal, it is decoded. The next decision, 930, determines if the instruction requires a byte in the information stream. If it does not, execution proceeds directly to testing the A/R status flags of the instruction at 970. If it requires a byte in the information stream, execution enters state 940, testing to see if the byte is available. If the byte is unavailable because it has already been shifted out of the pipeline into the memory of the attached data processing equipment 172 then the state machine program is erroneous, and execution proceeds to 942, entering the halted (reject) state. If the byte is not available because it has not yet been shifted into the pipeline (because it has not yet been received), control proceeds to 950, where the end-of-packet condition is tested. If the end of the packet has been seen, then no further byte can be received for the current packet, so the state machine enters the halted (reject) state, 952. Otherwise, control returns back to point 940 to wait for the byte to be received. If the byte is available, control proceeds to the test box 960 where the selected test is performed, as previously described. If the test produces a "false" result, control proceeds back to the instruction fetch, 910. If the test produces a "true" result, control proceeds to box 970, where the status of the accept/reject (A/R) field 320 in the instruction is tested. If the "accept" flag is set, the machine enters the halted (accept) state 972. If the "reject" flag is set, the machine enters the halted (reject) state 974. If neither flag is set, the value in the program counter (PC) is modified in accordance with the Next State field 350 and control returns to the instruction fetch cycle, 910.

The above embodiment is intended to be illustrative and is based upon the simple sequential instruction set processor model. Other embodiments which are functionally equivalent include those in which instruction fetching overlaps with one or more of the other operations, allowing the operations to effectively execute in parallel. This technique, known as "instruction pipelining" has been used for many years to implement both microcode and the native instruction set in conventional computing equipment and is well documented in the literature. Other embodiments may allow two or more instructions to be fetched and decoded; this is conventionally known as "superscalar" architecture and is a common approach for obtaining higher performance in computers. Well-known problems with these architectures include dealing with synchronizing results with the control stream. Many microcoded and Reduced Instruction Set Computers (RISC) require that the control flow branch determined by one instruction will not occur until after the completion of the execution of the next instruction. These methods introduce additional complexity, particularly in the generation of optimal instructions for implementing a specific set of tests, without changing the basic operation paradigm disclosed here, and in any case are well known and the solutions are well documented in the available body of literature. Therefore embodiments which include one or more of instruction pipelining, instruction lookahead, parallel instruction execution, "superscalar techniques", RISC implementations and the like are not substantive variants of the basic invention.

Advantageously, the information about the exact state which accepted the packet is encoded and passed to the attached data processor. This can be accomplished by passing the value of the program counter of the instruction which caused the acceptance as the value which can be read by the attached data processing equipment over status interface 115. Information on the state at which the decision was reached is helpful in determining what action is to be taken regarding the accepted packet, such as which applications program should process the packet, and how the packet should be processed, because the exact state information can define why the packet was considered acceptable.

In the preferred embodiment, when a packet is untestable, either because it contains data not anticipated by the state machine program, or because the state machine program is in error, the state machine enters the halted (reject) state 740, and the packet is discarded as has been described above. In another embodiment, these occurrences cause the state machine to enter the halted (accept) state 730 allowing the untestable packet to be transferred to attached data processing equipment 172 for diagnostic or other purposes.

Figure 8:
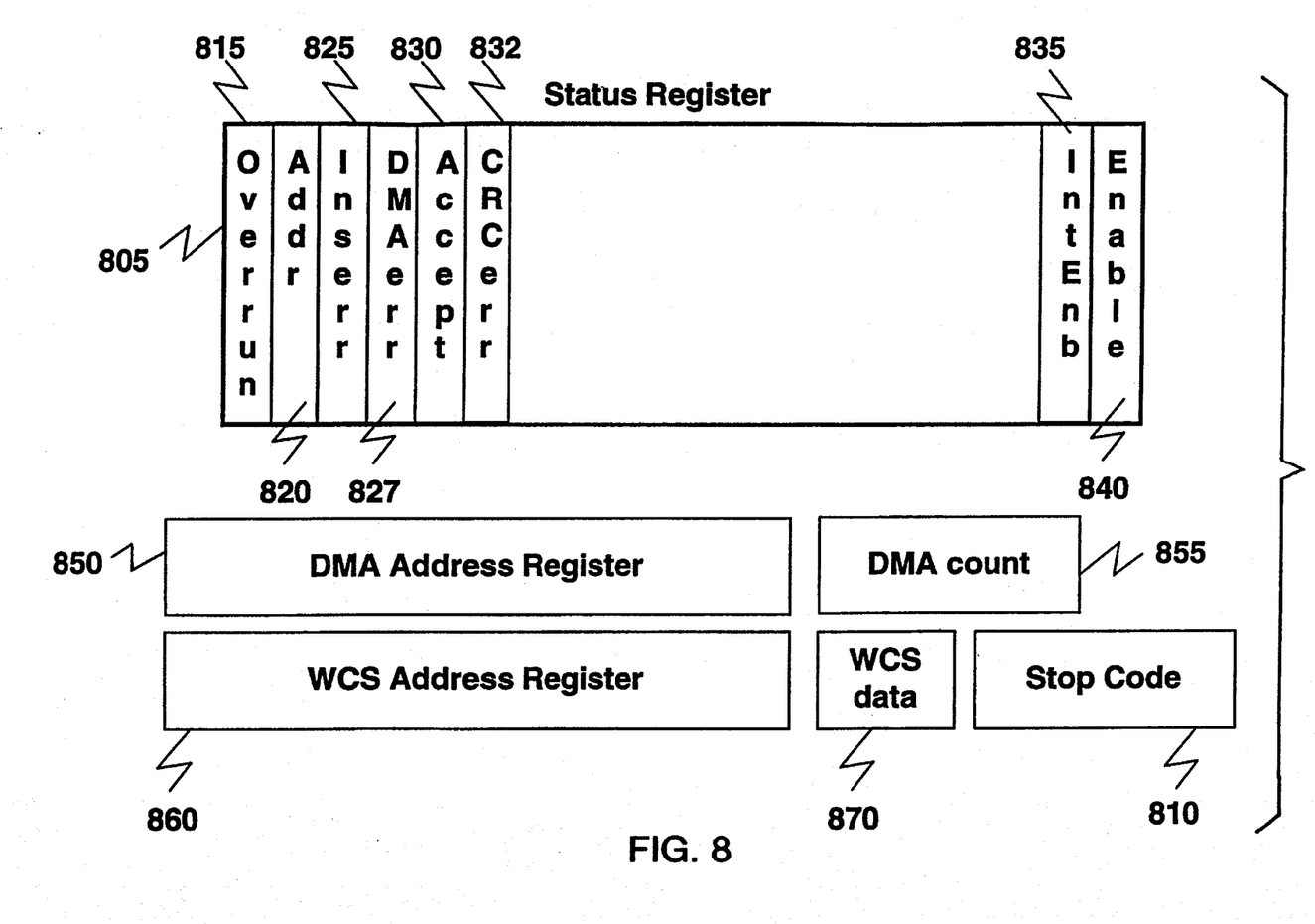
FIG. 8 illustrates a preferred embodiment comprising interface registers.

One possible embodiment of interface 115 is illustrated in FIG. 8. In practice, the optimal interface generally depends on the nature of the attached data processing equipment 172, including the processor 175, its system bus 165 and memory 170. Details of these elements may differ, and accordingly the illustrated embodiment is intended as exemplary rather than limiting. The interface should be consistent in style with other devices which can be connected to the attached data processing equipment, in order to minimize the effort required to understand the interface. In the embodiment illustrated in FIG. 8, a status register 805 contains some control bits and some status bits. One control bit 840 is an Enable bit which enables or disables state machine 100. If the Enable bit is set to one value (e.g., 1), the state machine leaves idle state 700 and enters running state 710. This transition sets other state in a manner described herein. If the Enable bit is set to the other value (e.g., 0), the state machine enters the idle state 700. Similarly, an Interrupt Enable bit 835 can be included, which indicates that state machine 100 can interrupt the attached data processor 175.

The particular bit arrangements employed for signaling and data transmission are based upon the nature of the attached data processing equipment. Thus for a given embodiment, it may be more appropriate to employ one or both of an interrupt enable bit and a state machine enable bit, or otherwise to vary signaling arrangements by choice of interrupts over status signals or the like. Nevertheless, an interrupt input to data processor 175 and a status signal for Enable bit 840 to state machine 100 are discussed herein as an exemplary arrangement.

When state machine 100 causes attached data processor 175 to be interrupted, additional bits provided in status register 805 preferably allow data processing equipment 172 to determine the reason for the interrupt. An Accept bit 830 can be set to a designated value, e.g., 1, if the reason for the interrupt is that an accepted packet has been completely transferred to the attached data processing equipment 172. If the interrupt occurs for any other reason, Accept bit 830 is set to the complement of the designated value, e.g., 0. Accept bit 830 is one of several bits that can be set by state machine 100 for signaling over status interface 115. If Accept bit 830 indicates that state machine 100 has entered an accept state, the Stop Code register 810 contains the address in the writable control store 105 of the instruction which caused the state machine to enter the Accept state. If the Accept bit indicates that the state machine has stopped for some other reason, the value in Stop Code register 810 is not defined. It is possible to provide for different actions under these conditions, according to several alternative embodiments.

If an illegal instruction operation code is detected, a preferred result is for state machine 100 to enter halted reject state 740. In addition, a signal is sent on status interface line 115 to set an Instruction Error bit 825 in status register 805. Preferably, this also interrupts attached data processor 175. Other conditions that may result in an Instruction Error include an illegal specification of the A/R bits (as per Table I), the specification of a Next State field 350 which exceeds the permitted range of addresses for a given size of the Writable Control Store 105, or in some embodiments the specification of an Offset field 330 that exceeds a preset limit.

If the offset field of an instruction requests a test on a byte that already has been shifted out of pipeline register 130, state machine 100 enters halted reject state 740 as described. In addition, a signal is sent on status interface line 115 to set an Address Error bit 820 in status register 805. In a preferred embodiment this additionally interrupts attached data processor 175.

If the packet CRC checking circuitry 155 detects an error in the received packet, the state machine 100 is notified that an error has occurred via signal line 156. This allows it to change its notification from "accept" to "reject". In addition, a CRC Error bit 832 is set in status register 805.

It is possible that DMA controller 145 may be unable to store a byte in memory, because of conditions set forth below. This condition can be used to generate a signal to set an Overrun bit 815 in status register 805, and preferably also interrupts attached data processing equipment 175. A DMA Address Register 850 can store a value set by data processing equipment 175, so that DMA access can proceed in the manner set forth below. A Writable Control Store Address Register 860 has another value set by data processing equipment 175. If the attached data processing equipment reads the Writable Control Store Data Register 870, the information read is the contents of the Writable Control Store 105 at the address specified by the Writable Control Store Address Register 860. In a similar manner, if the attached data processing equipment writes information to the Writable Control Store Data Register 870, this information is transferred to the Writable Control Store 105 at the address specified by the Writable Control Store Address Register 860. Each of these functions preferably is included as shown in the drawings, but it will be appreciated that various specific signaling arrangements are possible.

In a preferred embodiment, the number of bits in the Writable Control Store Data Register is determined by the nature of the attached data processing equipment, and will typically be 8, 16, or 32 bits of information. A distinct addressing scheme is used by state machine 100 to read the information from the Writable Control Store, wherein sequential addresses refer to instruction words, which in most embodiments will be a different organization than the manner in which information is transferred across the interface 110. Addressing circuitry that interfaces the Writable Control Store to the state machine and to the interface must take these differences into account. In general, the state machine can have a set of registers to function as accumulator and index registers, memory address registers, and associated gating for effecting the respective transfers between registers, logical operations and comparisons between the values of registers and the like, similar to a conventional central processing unit. Likewise, clock means and dividers can define operational cycles in which particular operations such as memory addressing, loading or storing from memory locations occur, also similar to operation of a general purpose central processor.

Figure 6A:
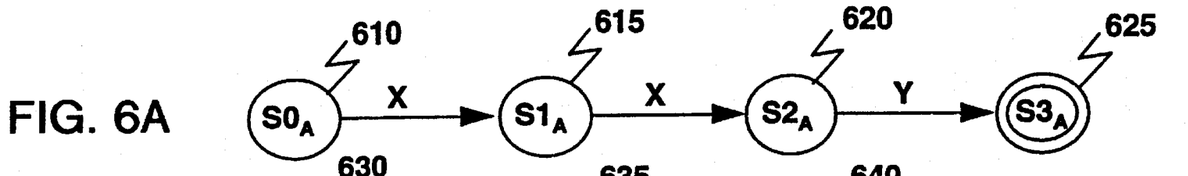
FIG. 6 illustrates a preferred embodiment comprising an optimization routine that handles cases of ambiguous recognition.
Figure 6B:
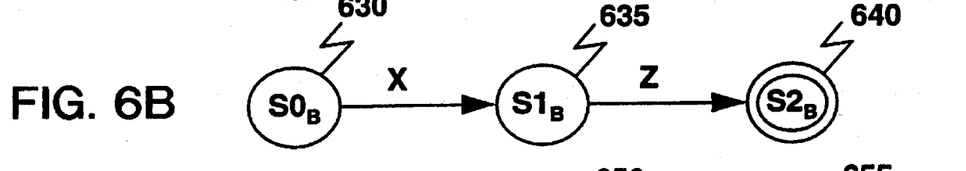
Figures 6C, 6D:
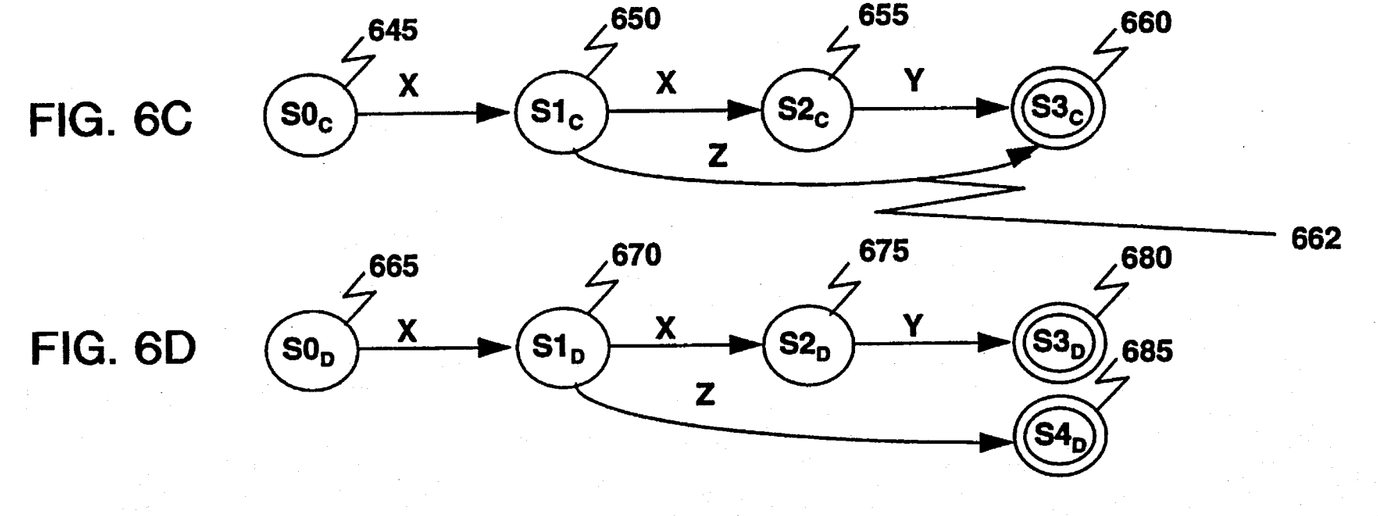

According to the preferred embodiments discussed herein, there are two special operations provided, namely "jump," which ignores the offset field and the value field and simply transfers control to the state specified in the next state field, and "nop", meaning "no operation", which ignores the offset field, the value field and the next state field. Preferably, the "jump" operation can be used to transfer control to another part of the program without actually comparing an input byte to the value field of the jump instruction word. Furthermore, a "jump" instruction can have either the Accept or Reject flag (encoded in the A/R field 320) set to force the state machine into an accept or reject state. A jump operation may be used, for example, in the process of optimizing a program, when two distinct states which result in recognition of two distinct patterns would be optimized to a single state. This can make it impossible for the attached data processing equipment to determine which of the two (or more) patterns actually was recognized, but it may be unnecessary to do so, for example, when the object is to check the byte stream for two synonyms. FIG. 6 shows an example in which a Finite State Machine (FSM), labeled A, recognizes an input sequence XXY. The FSM A starts in an initial state 610. Upon encountering an "X" in the input stream, it proceeds to state 615. Then upon encountering a following second "X" in the input stream, it proceeds to state 620. Then upon encountering a "Y" in the input stream, it proceeds to state 625, which is an accepting state. For simplicity of illustration, all transitions leading to rejecting states have been omitted in this figure. FSM B recognizes an input sequence XZ. FSM B starts in an initial state 630. Upon encountering an "X" in the input stream, it proceeds to state 635; upon encountering a following "Z" in the input stream it proceeds to state 640, which is an accepting state. Assuming, for example, "XXY" and "XZ" mean the same thing, it is advantageous to check for either of them. If as shown in FIG. 6 one constructs an FSM C which recognizes the sequences recognized by either FSM A or FSM B (expressed as the notation A|B using conventional Finite State Machine algebra), and then optimizes FSM C using conventional methods, the result is the machine shown, which starts in initial state 645. Upon encountering an "X" in the input stream it proceeds to state 650. Upon encountering a "Z" in the input stream it proceeds to state 660, namely an accepting state. If, however, while in state 650 it encounters an "X" in the input stream, it proceeds instead to state 655. If it then encounters a "Y" in the input stream it proceeds to state 660, the same accepting state. Once at state 660, it is not possible to distinguish whether the transition to state 660 was the result of reading the input characters XZ or the input characters XXY. While this machine uses the fewest number of states to recognize its set of input strings, it is not possible unambiguously to inform the attached data processing equipment 172 exactly which of the two possible valid inputs was accepted. This situation can be rectified if it is desirable to know the exact path of acceptance, or can be tolerated, for example, if it is unnecessary to distinguish packets containing XXY vs. XZ. To reserve the capability of distinguishing unambiguously, the transition to the accepting state 662 can be kept as a transition to a unique state, as shown in FSM D in FIG. 6. The result is a machine which, although not minimal, is unambiguous. The machine D starts out in an initial state 665. An "X" in the input stream causes it to proceed to state 670. If another "X" is encountered, it proceeds to state 675, and a following "Y" causes it to proceed to state 680, an accepting state. If, however, while in state 670 it encounters a "Z" in the input stream, it proceeds to state 685, which is a unique accepting state. By determining which accepting state the machine reached, preferably by the program count at the time of acceptance, the data processing equipment 172 can distinguish whether the input string was the sequence "XXY" or the sequence "XZ".

Preferably, the rate at which state machine 100 executes instructions is faster than the byte reception rate, whereby it is possible to execute all the tests provided for a given byte before a next byte is received. However, the relative speeds of state machine 100 and the communications network may be such that not all instruction sequences can be completed with respect to a given byte before a next byte arrives. The incrementing of offset counter 140 and storing of the byte in the pipeline register 130 occurs only when the state machine is about to execute an instruction. These values do not change during the instruction execution. Control circuits of the receiver and/or pipeline register can cause any signals received from the receiver 120 to be held or staged such that the values in the pipeline register and the offset counter remain fixed for an instruction execution cycle of state machine 100. Since the offsets in the packet referenced by instruction word offset 330 are absolute offsets, the correct byte in the pipeline register can be addressed by subtracting the offset register value from the instruction offset word value, to obtain a byte address in the pipeline register. If this value is negative, the desired byte has not yet reached the pipeline register. This situation can be tested and used to generate a signal that suspends execution of instructions by state machine 100 until the desired byte enters pipeline register 130 and is available. On the other hand, if the value is positive but less than or equal to the highest address for the pipeline register, the pipeline register cell containing the respective byte preferably can be addressed and its value used to execute the instruction. If the value is positive and greater than the highest address for the pipeline registers, state machine 100 will be unable to perform the test because the byte has passed. In a preferred embodiment, this results in the packet being rejected, and additionally generates an error signal to processor 175 over signal line 115, indicating that the program has failed because of a pipeline addressing error.

Figure 4A:
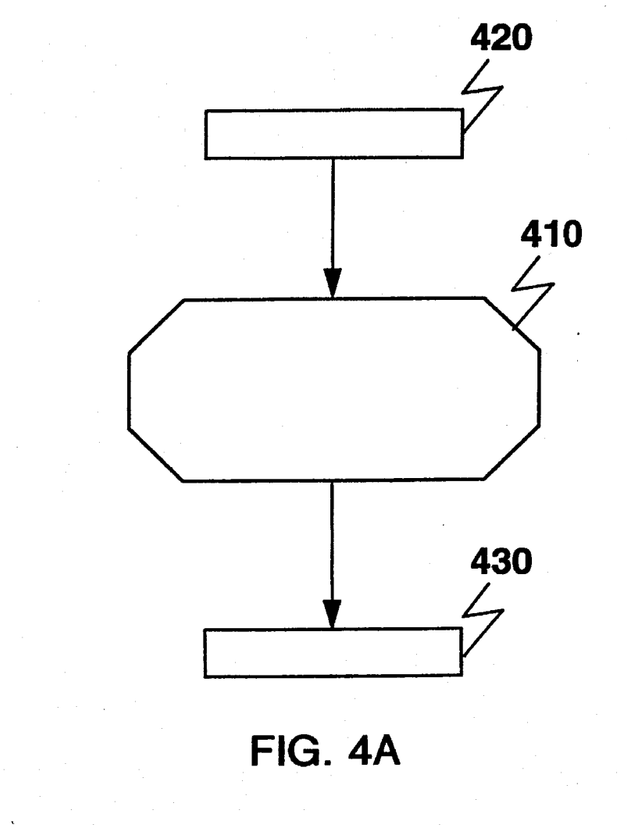
FIG. 4 illustrates how several independent Writable Control Store programs are combined into a single Writable Control Store program operable according to the invention to recognize a plurality of requests.
Figure 4B:
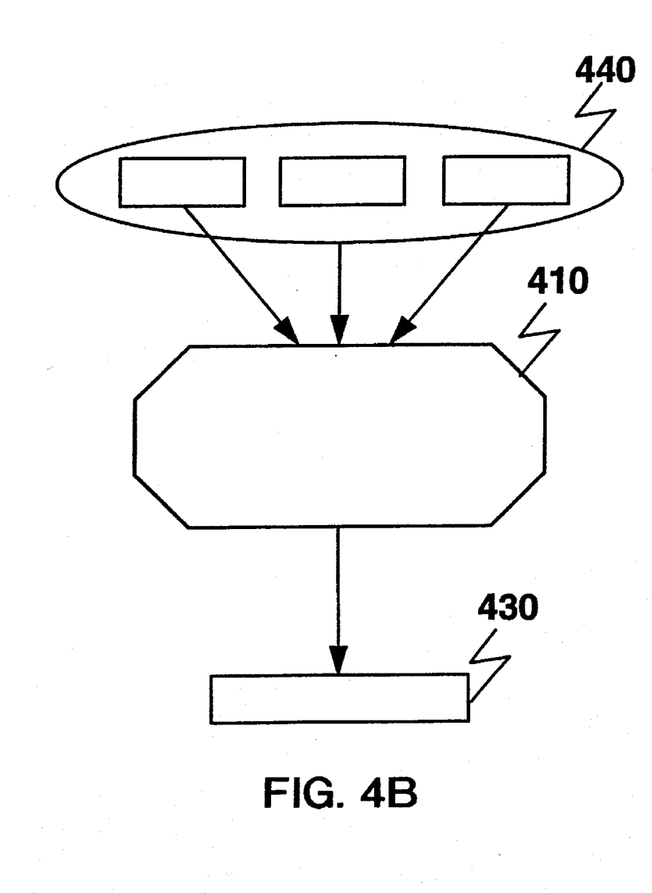

Because of the limited size of the preferred pipeline register 130, incoming bytes should be tested insofar as possible in the order of their reception. Referring to FIG. 4, the task of organizing the tests so that they are arranged in the correct sequence to take advantage of the limited size of pipeline register 130 preferably is performed by a state machine compiler 410. Compiler 410 accepts a sequence of tests, for example, from criteria supplied by processor 175, and organizes the tests into a sequence of state machine instructions 430 suitable for efficient execution. State machine 100 thus becomes a Finite State Automaton (FSA). Compiler 410 also can be arranged to recognize a class of inputs known as regular expressions, for example described by a formal notation such as a Type 3 grammar. While it may appear that the availability of numeric and logical bit mask comparisons and the like results in a machine that is more powerful than a conventional FSA, the device is functionally similar to an FSA. The techniques used to reorder the input specification, or to combine a plurality of independent specifications 440 into a single specification 430, preferably comply with the well documented mathematics of Finite State Automata.

In a preferred embodiment of the invention, a program that can be termed a "filter manager" runs on attached data processing equipment 172 to mediate among independent applications programs that wish to process packet-filtered requests simultaneously. The filter manager accepts specifications in an input language from each of the applications, and then implements the functions of filter compiler 410, i.e., accepting the packet selection/rejection specifications and compiling them into a series of state machine instructions that are then loaded as a machine language program into state machine 100. If any application changes its filtering requirements, or terminates its execution such that its filter request becomes unnecessary, a new filter request (including an empty filter request in the case of termination of an application) is processed together with any requests from remaining applications, and a new program is created and loaded into the state machine Writable Control Store 105. Accordingly, variable selection/rejection criteria for one or a number of applications based upon content of received packets can be effected by state machine 100 and updated as required by the applications, which renders the arrangement very versatile.

Type 3 grammars have well known mathematical properties. It is possible to use known techniques for combining FSA descriptions and optimizing the state machine instruction sequence. For example, if A represents a sequence of tests for recognizing a packet according to some content criteria, and B represents a different sequence of tests for recognizing a different packet according to some other content criteria, then it is readily possible to define state machine instructions that recognize the sequence defined as A¦B (where "¦" means "or"). Furthermore, because of the properties of FSAs, it is possible to analyze the sequence and to construct a single FSA that recognizes A¦B using a minimum number of instructions or states. Optimization of test instructions or states is well known, and in fact is treated with mathematical rigor in many introductory textbooks on automata theory. In a preferred embodiment the filter manager implements state optimization when defining the instructions to be loaded into state machine 100.

Figure 5:
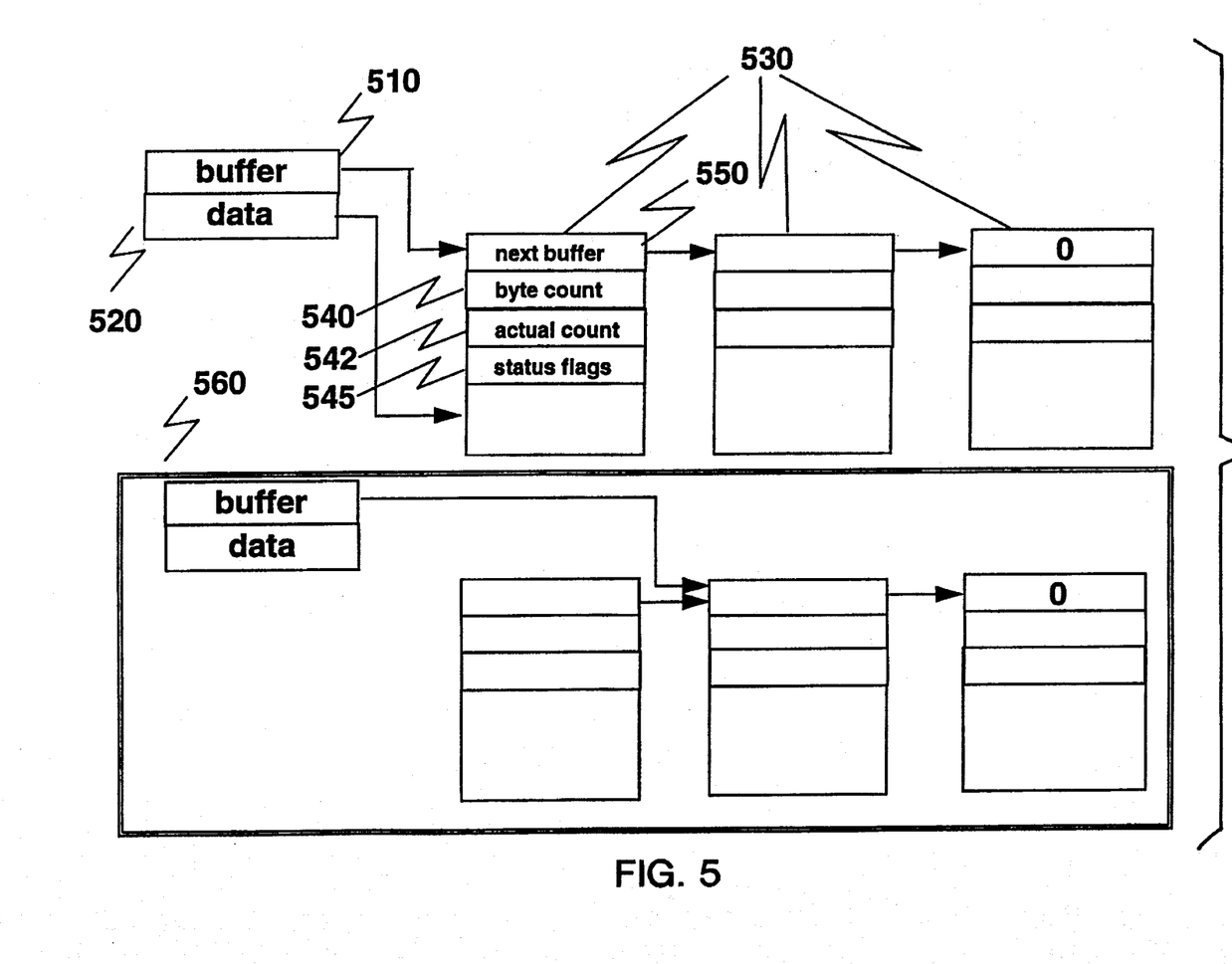
FIG. 5 illustrates a preferred embodiment wherein selected data packets are written to the memory of the attached data processing equipment via a Direct Memory Access (DMA) channel.

As discussed generally above, in a preferred embodiment the bytes of a received packet pass through pipeline register 130 and are transferred to attached processor memory 170 by Direct Memory Access (DMA) interface 145. The destination of the bytes is a sequence of memory buffers that can be organized as shown in FIG. 5. The DMA address governing DMA controller 145 is held in a pair of registers, namely a buffer address register 510 and a data pointer register 520. Buffer address register 510 holds the address of a packet buffer in memory 170, while data pointer register 520 holds the address or offset of a byte within the packet buffer. As the bytes of a packet are received, the buffer address 510 remains fixed, while the data address 520 is incremented each time DMA controller 145 stores a byte into attached memory 170. The buffer address used initially by the DMA controller is the address of the first buffer in chain of buffers 530 which are initialized by the attached data processor 175 and linked together through their next buffer fields 550. If a packet is rejected, the data address is reset to point to the buffer beginning address 510 and no further processing is done until a new packet arrives. If a packet is accepted, status field 545 is set to a known value, e.g., 1, and the value in the next buffer location 550, to which the DMA buffer register 510 still refers, is transferred to the DMA buffer register, leaving the system in configuration 560. Processor 175 is interrupted to indicate that a packet has been accepted. The software running in the processor can examine the buffer chain and determine that the first buffer now contains packet data, based on the value in the status flag 545.

If the value which would be loaded into the DMA address register is 0, information transfer preferably is blocked, and the processor is interrupted to indicate that available buffer space has been exhausted. If a valid address is not explicitly loaded into the DMA buffer register by the processor before the first byte is to be transferred out of the pipeline register 130 into memory, state machine 100 preferably is halted, and the packet is rejected. A status flag in the status register can be set to indicate a DMA addressing failure.

The operation as described above can be implemented by means of a conventional general purpose processor, or a limited function processor can be arranged to effect the functions described. In the case of a general purpose processor, the compiler can take the selection criteria intended for the Writable Control Store and compile them into executable machine instructions on the conventional processor. Preferably, additional speed is obtained by use of a high speed signal processing chip, such as the Intel i860 family, AMD 29000 family, or Texas Instruments "C30" (TMS320C30) or successor chips "C40" or "C50" of the same processor family. Furthermore, substantial performance improvement can be obtained by using a custom VLSI implementation of the preferred embodiment.

In an alternative embodiment, the architecture of the filter engine remains substantially the same, but instead of using a sequential processing method and a state machine, the state machine 100 can be replaced with a programmable systolic array processor, such as the iWARP processor or similar processor. Yet another alternative embodiment would use a programmable neural net recognition system. Both systolic array processors and neural nets can implement functionality equivalent to that described herein, differing only in details of how they are programmed and their ability to handle data in parallel, rather than serially evaluating as disclosed herein. Both systolic array processors and neural nets are well-documented in the literature.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A device for selectively processing digital information from a communication line for selectively coupling portions of said digital information for processing by a data processor, the device comprising:

means for receiving the digital information;

a digital filter apparatus coupled to said means for receiving and to said data processor, said filter apparatus for inputting selection criteria and comparing successive portions of said digital information to the selection criteria, and providing to the data processor portions that meet the selection criteria; and, wherein the digital filter apparatus is variably programmable for defining the selection criteria based upon a comparison of bytes to the selection criteria, and wherein the selection criteria is variable by content of the bytes and by position of the bytes in the successive portions of the digital information.

2. The device of claim 1, wherein the portions of digital information comprise serially received data packets, each packet containing a plurality of bytes.

3. The device of claim 2, wherein the digital filter apparatus comprises means for executing a plurality of comparison instructions in a branching decision pattern having at least one acceptance condition and at least one rejection condition.

4. The device of claim 3, wherein the branching decision pattern has a plurality of acceptance conditions, and further comprising signaling means coupled to the data processor, said signal means for encoding an identity of one of the acceptance conditions which is reached as a result of executing the comparison instructions.

5. The device of claim 3, wherein the digital filter apparatus comprises means for executing a plurality of byte comparisons (a recognition process) according to a stored program, the stored program defining the branching decision pattern whereby the filter apparatus proceeds to determine the acceptance or rejection condition.

6. The device of claim 5, wherein the digital filter apparatus is operable to accept the selection criteria from the data processor in a representation suitable to the data processor, and wherein the signaling means is coupled to the data processor for encoding the identity of the acceptance condition which is reached as a result of the recognition process.

7. The device of claim 6, wherein the stored program comprises a plurality of comparison instructions and wherein at least one of the acceptance condition and the rejection condition can be reached as a result of executing the comparison instructions.

8. The device of claim 6, wherein the stored program defines a program for a systolic array processor, and wherein the acceptance condition is reached as the result of executing the stored program using a systolic array processor.

9. The device of claim 6, wherein the stored program defines a neural network, and at least one of the acceptance condition and the rejection condition can be reached as a result of an operation of a neural network processor.

10. The device of claim 6, wherein the digital filter apparatus comprises a state machine coupled to a pipeline register, the bytes being shifted through the pipeline register, and wherein the instructions specify at least a relative position of bytes being compared to the selection criteria.

11. The device of claim 6, wherein the digital filter apparatus comprises a state machine coupled to a pipeline register, the bytes being shifted through the pipeline register during execution of successive instructions by the state machine.

12. The device of claim 3, wherein the selection criteria comprises comparisons for equality and inequality of the bytes with a value specified in the comparison instructions.

13. The device of claim 12, wherein the selection criteria further comprises comparisons for greater-than and less-than, and bitwise mask comparison with said value specified in the comparison instructions.

14. The device of claim 13, wherein the selection criteria further comprises alternative signed and unsigned comparisons.

15. The device of claim 1, wherein the digital filter apparatus is operable to accept the selection criteria from the data processor.

16. The device according to claim 15, wherein at least one of the data processor and the digital filter apparatus comprise means for combining a plurality of independent selection criteria into a single recognition program which is operable on the digital filter apparatus.

17. A method for selectively processing digital information from a communication line, said digital information being represented by a plurality of packets, each packet containing information units having variable content, the method comprising the steps of: defining a selection criteria whereby individual packets are to be accepted for processing based upon their content; receiving the digital information from the communication line; comparing the digital information to the selection criteria by operation of a recognition program; coupling the digital information to an attached data processor when the selection criteria are met; and, variably defining new selection criteria that differ from said selection criteria, and comparing and coupling the digital information to the attached data processor according to the new selection criteria.

18. The method of claim 17, wherein the comparing is accomplished by proceeding through a branching decision pattern of comparisons, the decision pattern defining a recognition process and terminating in at least one accept decision and at least one reject decision.

19. The method of claim 18, wherein the decision pattern is defined by Finite State Machine descriptions.

20. The method of claim 19, wherein the Finite State Machine descriptions include equality and inequality comparisons.

21. The method of claim 20, wherein the Finite State Machine descriptions include comparisons for signed comparisons, unsigned comparisons, greater than and less than comparisons and bitwise mask tests.

22. The method of claim 21, further comprising optimizing the Finite State Machine descriptions for at least one of minimizing a number of said descriptions, and minimizing alternative paths to one of said accept decision and said reject decision.

23. The method of claim 18, wherein the decision pattern is defined by a systolic array processor program.

24. The method of claim 23, further comprising combining a plurality of independent recognition programs into a single recognition program forming a new systolic array processor program.

25. The method of claim 18, wherein the decision pattern is defined by a neural network program.

26. The method of claim 25, further comprising combining a plurality of independent recognition programs into a single recognition program forming a new neural network program.

27. The method of claim 18, further comprising combining a plurality of independent recognition programs into a single recognition program forming the Finite State Machine descriptions.

* * * * *